(12) United States Patent
Mori (10) Patent No.: US 12,132,875 B2
(45) Date of Patent: Oct. 29, 2024

(54) WIRELESS COMMUNICATION DEVICE INCLUDING MAIN SUBSTRATE CONFIGURED TO CONTROL IMAGE FORMING UNIT

(71) Applicant: BROTHER KOGYO KABUSHIKI KAISHA, Nagoya (JP)

(72) Inventor: Takato Mori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 22 days.

(21) Appl. No.: 17/706,856

(22) Filed: Mar. 29, 2022

(65) Prior Publication Data
US 2022/0321720 A1   Oct. 6, 2022

(30) Foreign Application Priority Data
Mar. 31, 2021  (JP) .................................. 2021-061759

(51) Int. Cl.
H04N 1/00         (2006.01)
(52) U.S. Cl.
CPC ..... H04N 1/00538 (2013.01); H04N 1/00315 (2013.01); H04N 1/00904 (2013.01); *H04N 2201/0055* (2013.01)
(58) Field of Classification Search
None
See application file for complete search history.

(56) References Cited

U.S. PATENT DOCUMENTS

| 2007/0273899 | A1* | 11/2007 | Yazawa | ................... | B41J 2/2132 |
| | | | | | 358/1.4 |
| 2015/0261982 | A1* | 9/2015 | Kaechi | ............... | G06K 7/10158 |
| | | | | | 340/10.34 |
| 2015/0347061 | A1* | 12/2015 | Terakado | .............. | G06F 3/1271 |
| | | | | | 358/1.15 |
| 2018/0287302 | A1* | 10/2018 | Kim | ................... | H01R 13/6466 |
| 2019/0104212 | A1* | 4/2019 | Lee | ....................... | H01Q 9/0435 |
| 2020/0412017 | A1* | 12/2020 | Park | ...................... | H01Q 21/24 |
| 2022/0278437 | A1* | 9/2022 | Mori | ........................ | H01Q 1/38 |

FOREIGN PATENT DOCUMENTS

| JP | 2000-151155 A | 5/2000 |
| JP | 2010-228331 A | 10/2010 |
| JP | 2018-158446 A | 10/2018 |

* cited by examiner

*Primary Examiner* — Akwasi M Sarpong
*Assistant Examiner* — Pawan Dhingra
(74) *Attorney, Agent, or Firm* — KENEALY VAIDYA LLP (57) ABSTRACT

A wireless communication device includes: a main substrate including: a first connector having a detection terminal, an earth terminal and an output terminal; a current circuit configured to cause current to flow toward the detection terminal; a ground wired to the earth terminal; a power supply circuit configured to supply a voltage toward the output terminal; and a controller configured to stop supply of the voltage to the output terminal by the power supply circuit; and a wireless communication substrate including a second connector having a first terminal, a second terminal, and an input terminal, the first terminal and the second terminal being electrically connected, in which the controller is configured to detect that the current no longer flows via the detection terminal, the first terminal, the second terminal and the earth terminal.

3 Claims, 8 Drawing Sheets

WIRELESS COMMUNICATION DEVICE INCLUDING MAIN SUBSTRATE CONFIGURED TO CONTROL IMAGE FORMING UNIT

CROSS-REFERENCE TO RELATED APPLICATIONS

This application is based on and claims priority under 35 USC 119 from Japanese Patent Application No. 2021-061759 filed on Mar. 31, 2021, the contents of which are incorporated herein by reference.

TECHNICAL FIELD

The present disclosure relates to a wireless communication device.

BACKGROUND

A related art discloses an image forming apparatus having a substrate on a main body-side to which a circuit substrate for wireless communication can be attached.

In the image forming apparatus of the related art, the substrate on a main body-side and the circuit substrate for wireless communication are provided with connectors, respectively. A user can attach the circuit substrate for wireless communication to the substrate on a main body-side by inserting the connector on the circuit substrate for wireless communication into the connector on the substrate on a main body-side. The user can also detach an electrical component from the substrate on a main body-side by pulling out the connector on the circuit substrate for wireless communication from the connector on the substrate on a main body-side.

SUMMARY

A wireless communication device according to one illustrative aspect of the present disclosure includes a main substrate and a wireless communication substrate. The main substrate may include: a first connector having a detection terminal, an earth terminal and an output terminal; a current circuit configured to cause current to flow toward the detection terminal; a ground wired to the earth terminal, a power supply circuit configured to supply a voltage toward the output terminal; and a controller configured to stop supply of the voltage to the output terminal by the power supply circuit when the controller detects that current no longer flows, from a state of detecting the current flowing from the current circuit to the ground via the detection terminal, a first terminal, a second terminal and the earth terminal. The wireless communication substrate may be configured to be attached to the main substrate or detached from the main substrate. The wireless communication substrate may include a second connector having the first terminal configured to be connected to the detection terminal, the second terminal configured to be connected to the earth terminal, and an input terminal configured to be connected to the output terminal. The first terminal and the second terminal may be electrically connected.

According to the above-described configuration, when the first connector and the second connector are connected, the current caused to flow toward the detection terminal by the current circuit flows from the detection terminal into the ground part via the first terminal connected to the detection terminal, the second terminal connected to the first terminal via the wiring and the earth terminal connected to the second terminal.

In addition, according to the above-described configuration, in a case where the second connector connected to the first connector is pulled out from the first connector, when the first terminal connected to the detection terminal is uncoupled from the detection terminal and/or the second terminal connected to the earth terminal is uncoupled from the earth terminal, the current does not flow in order of the current circuit, the detection terminal, the first terminal, the second terminal, the earth terminal, and the ground part.

Therefore, according to the above-described configuration, by detecting that the current caused to flow toward the detection terminal by the current circuit no longer flows, the controller can prevent, when a user pulls out the second connector on the wireless communication substrate from the first connector on the main substrate, a voltage from being supplied from the output terminal of the main substrate to the input terminal of the wireless communication substrate in a state where the ground part is not connected to the second terminal of the wireless communication substrate.

A wireless communication device according to one aspect of the present application includes: a main substrate, a sub-substrate, and a wireless communication substrate. The main substrate includes: a first connector having a detection terminal, an earth terminal and an output terminal; a current circuit configured to cause current to flow toward the detection terminal; a ground wired to the earth terminal; a power supply circuit configured to supply a voltage toward the output terminal; and a controller configured to stop supply of the voltage to the output terminal by the power supply circuit when the controller detects that current no longer flows, from a state of detecting the current flowing from the current circuit to the ground via the detection terminal, a first sub-terminal, a second sub-terminal and the earth terminal. The sub-substrate includes: a first sub-connector having the first sub-terminal capable of connecting to the detection terminal, the second sub-terminal capable of connecting to the earth terminal and a third sub-terminal capable of connecting to the output terminal; and a second sub-connector connected to the second connector on the wireless communication substrate. The wireless communication substrate is configured to be attached to the main substrate or detached from the main substrate via the sub-substrate. The wireless communication substrate includes a second connector. The first sub-terminal and the second sub-terminal are electrically connected.

According to the above-described configuration, the similar effect to the above-described illustrative aspect can be achieved even when the first connector on the main substrate and the second connector on the wireless communication substrate are connected via the sub-substrate on which the first sub-connector capable of connecting to the first connector on the main substrate and the second sub-connector capable of connecting to the second connector on the wireless communication substrate are provided.

A wireless communication device according to one illustrative aspect of the present disclosure includes: a main substrate including: a first connector having a detection terminal, an earth terminal and an output terminal; a current circuit configured to cause current to flow toward the detection terminal; and a ground wired to the earth terminal, and a power supply circuit configured to supply a voltage toward the output terminal; a sub-substrate including: a first sub-connector having a first sub-terminal capable of connecting to the detection terminal and a second sub-terminal configured to be connected to the earth terminal and a third sub-terminal configured to be connected to the output terminal; and a second sub-connector connected to the second connector on the wireless communication substrate, the first sub-terminal and the second sub-terminal being electrically connected; and a wireless communication substrate configured to be attached to the main substrate or detached from the main substrate via the sub-substrate, the wireless communication substrate including a second connector.

A wireless communication device according to one illustrative aspect of the present disclosure includes a main substrate and a wireless communication substrate. The main substrate includes: a first connector having a detection terminal, an earth terminal and an output terminal; a current circuit configured to cause current to flow toward the detection terminal, a ground part wired to the earth terminal; and a power supply circuit configured to supply a voltage toward the output terminal. The wireless communication substrate is configured to be attached to the main substrate or detached from the main substrate. The wireless communication substrate includes a second connector having a first terminal configured to be connected to the detection terminal, a second terminal configured to be connected to the earth terminal and an input terminal configured to be connected to the output terminal. The first terminal and the second terminal are electrically connected.

According to the above-described configuration, when the first connector and the second connector are connected, the current caused to flow toward the detection terminal by the current circuit flows from the detection terminal into the ground part via the first terminal connected to the detection terminal, the second terminal connected to the first terminal via the wiring and the earth terminal connected to the second terminal.

In addition, according to the above-described configuration, in a case where the second connector connected to the first connector is pulled out from the first connector, when the first terminal connected to the detection terminal is uncoupled from the detection terminal and/or the second terminal connected to the earth terminal is uncoupled from the earth terminal, the current does not flow in order of the current circuit, the detection terminal, the first terminal, the second terminal, the earth terminal, and the ground part.

A wireless communication device according to one illustrative aspect of the present disclosure includes a main substrate, a sub-substrate, and a wireless communication substrate. The main substrate includes: a first connector having a detection terminal, an earth terminal and an output terminal; a current circuit configured to cause current to flow toward the detection terminal; and a ground wired to the earth terminal, and a power supply circuit configured to supply a voltage toward the output terminal. The sub-substrate includes: a first sub-connector having a first sub-terminal configured to be connected to the detection terminal and a second sub-terminal configured to be connected to the earth terminal and a third sub-terminal configured to be connected to the output terminal; and a second sub-connector connected to the second connector on the wireless communication substrate, the first sub-terminal and the second sub-terminal being electrically connected.

The wireless communication substrate is configured to be attached to the main substrate or detached from the main substrate via the sub-substrate. The wireless communication substrate includes a second connector.

According to the above-described configuration, the similar effect to the above-described illustrative aspect can be achieved even when the first connector on the main substrate and the second connector on the wireless communication substrate are connected via the sub-substrate on which the first sub-connector capable of connecting to the first connector on the main substrate and the second sub-connector capable of connecting to the second connector on the wireless communication substrate are provided.

According to an illustrative aspect of the present disclosure, it is possible to prevent, when the user pulls out the connector on the wireless communication substrate from the connector on the main substrate, the voltage from being supplied from the main substrate-side to the wireless communication substrate-side in a state where the ground is not connected to the ground terminal of the wireless communication substrate.

BRIEF DESCRIPTION OF THE DRAWINGS

Illustrative embodiments of the disclosure will be described in detail based on the following figures, wherein.

DETAILED DESCRIPTION

In a case of attaching a wireless communication substrate to a main substrate, like the related art, the respective connectors thereof are provided with a power supply terminal and a ground terminal. When the connectors are connected each other, the power supply terminals and the ground terminals of the connectors are respectively electrically connected each other.

In the meantime, the connector on the main substrate and the connector on the wireless communication substrate are attached and detached by a user's hand. Therefore, when the user pulls out a connector on a component from the connector on the substrate, the ground terminals are uncoupled from each other earlier than the power supply terminals while the power supply terminals remain electrically connected, depending on pullout methods. In this case, a ground is no longer connected to the ground terminal of the wireless communication substrate, and a voltage may be supplied from the substrate-side to the wireless communication substrate while a potential of the ground terminal of the wireless communication substrate is floating electrically.

An illustrative aspect of the present disclosure is to prevent, when a user pulls out a connector on a wireless communication substrate from a connector on a main substrate, a voltage from being supplied from the main substrate-side to the wireless communication substrate-side in a state where a ground is not connected to a ground terminal of the wireless communication substrate.

First Illustrative Embodiment

Hereinafter, before describing characteristic configurations of the present disclosure, a configuration of an image forming apparatus 1 according to a first illustrative embodiment of the present disclosure will be first described for understanding of the present disclosure.

<Configuration of Image Forming Apparatus 1>

Figure 1:
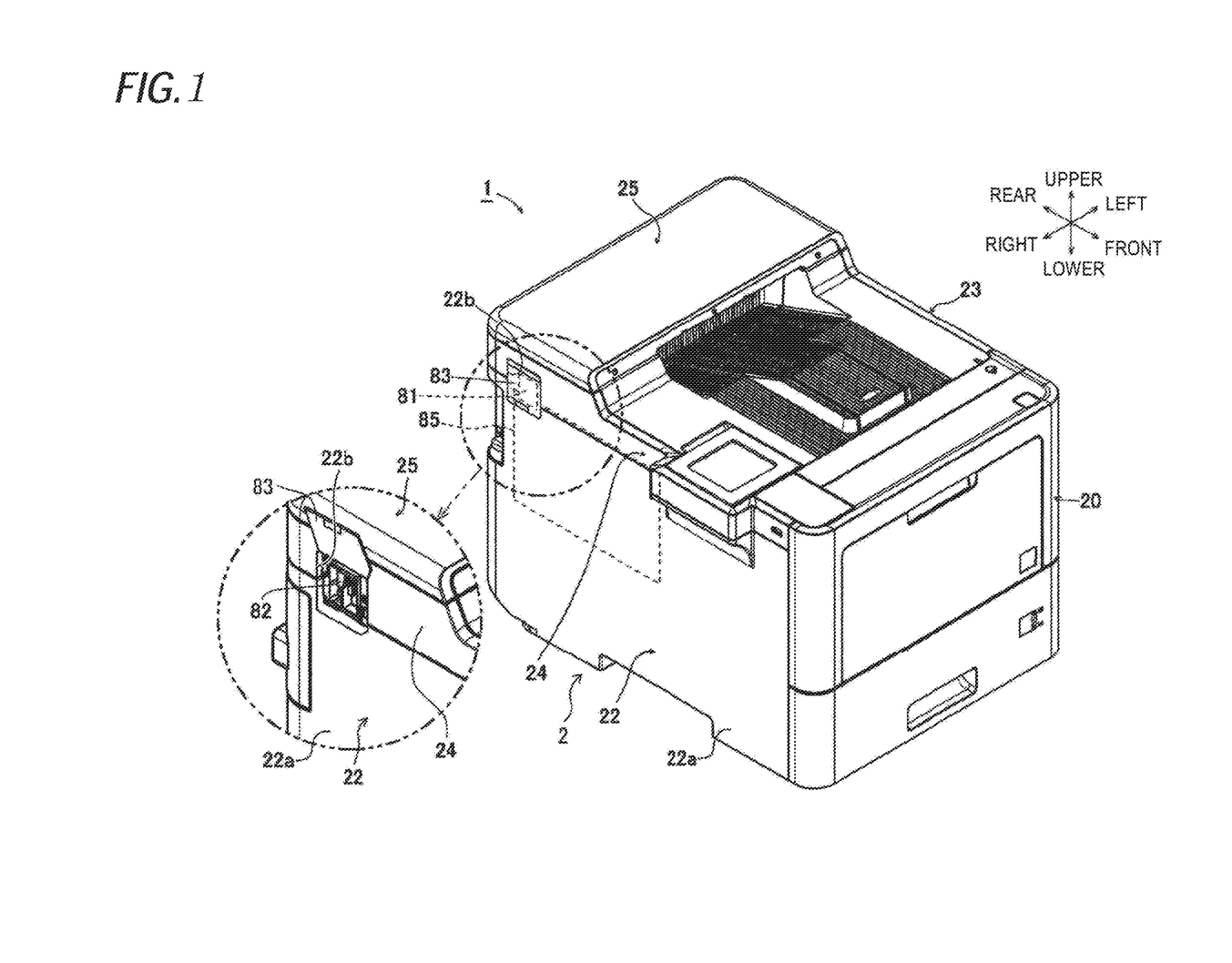
FIG. 1 is a perspective view showing an image forming apparatus according to a first illustrative embodiment of the present disclosure.
Figure 2:
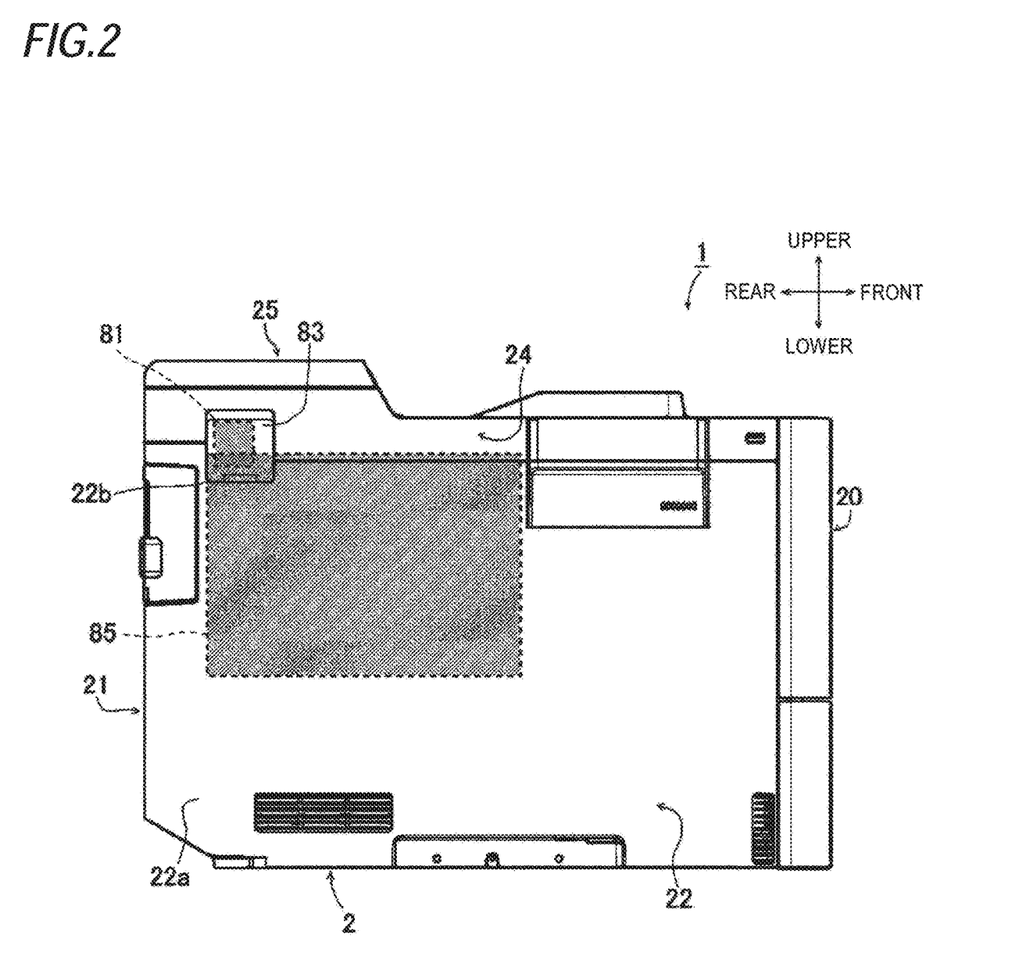
FIG. 2 is a right side view showing the image forming apparatus according to the first illustrative embodiment of the present disclosure.

FIG. 1 is a perspective view showing an image forming apparatus 1 according to a first illustrative embodiment of the present disclosure. FIG. 2 is a right side view showing the image forming apparatus 1. The image forming apparatus 1 is an example of the wireless communication device of the present disclosure.

In descriptions below, the right lower side of FIG. 1 is defined as the front side of the image forming apparatus 1, the left upper side of FIG. 1 is defined as the rear side of the image forming apparatus 1, the right upper side of FIG. 1 is defined as the left side of the image forming apparatus 1, and the left lower side of FIG. 1 is defined as the right side of the image forming apparatus 1. In addition, the upper side and the lower side of FIG. 1 are respectively defined as the upper side and the lower side of the image forming apparatus 1.

The image forming apparatus 1 has an apparatus body 2. The apparatus body 2 is a housing configured to accommodate a feeder unit, an image forming unit, a discharge part, a re-conveying unit, a motor and the like, which are not shown. As shown in FIGS. 1 and 2, the apparatus body 2 is configured by a front surface cover 20, a rear surface cover 21, a right side surface cover 22, a left side surface cover 23, an upper surface cover 24 and a top cover 25.

The image forming apparatus 1 has a main substrate 85, a holder 82 and an opening/closing cover 83. The main substrate 85 is a control substrate arranged behind the right side surface cover 22 and configured to control each unit of the image forming apparatus 1. The holder 82 is configured to hold a wireless communication substrate 81 and a sub-substrate 86. The image forming apparatus 1 is configured so that a user can attach and detach the holder 82 to and from the main substrate 85 in a state where the opening/closing cover 83 is opened.

The wireless communication substrate 81 is a substrate configured to communicate with an external terminal such as a smart phone by radio waves and to implement wireless communication by wireless LAN. Note that, in the present illustrative embodiment, a case where the wireless communication substrate 81 is a substrate for wireless LAN (Local Area Network) is exemplified. However, the wireless communication substrate 81 may also be a substrate configured to implement wireless communication by other communication standards, and for example, may be a substrate for NFC (Near Field Communication), a substrate for Bluetooth (registered trademark), or the like.

Figure 3:
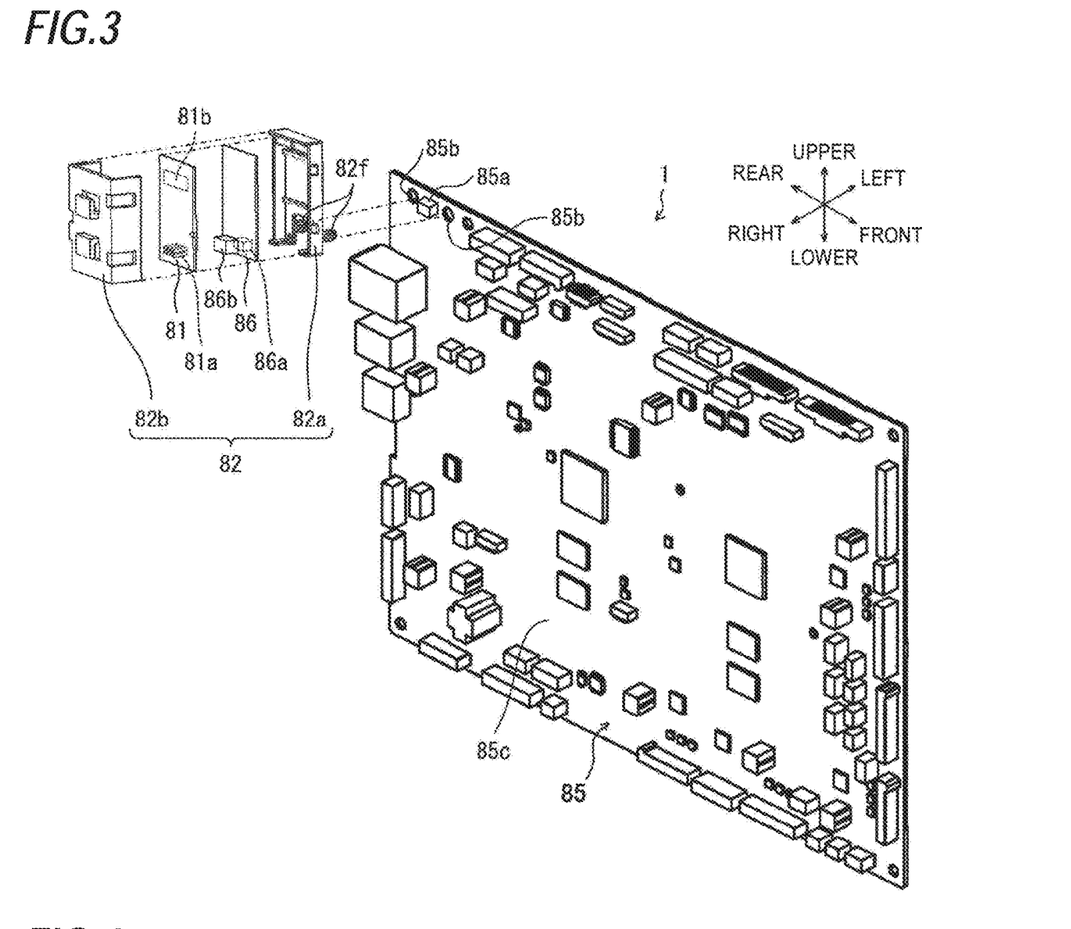
FIG. 3 is a perspective view showing an attached situation of a holder, a wireless communication substrate and a sub-substrate to a main substrate.
Figure 4:
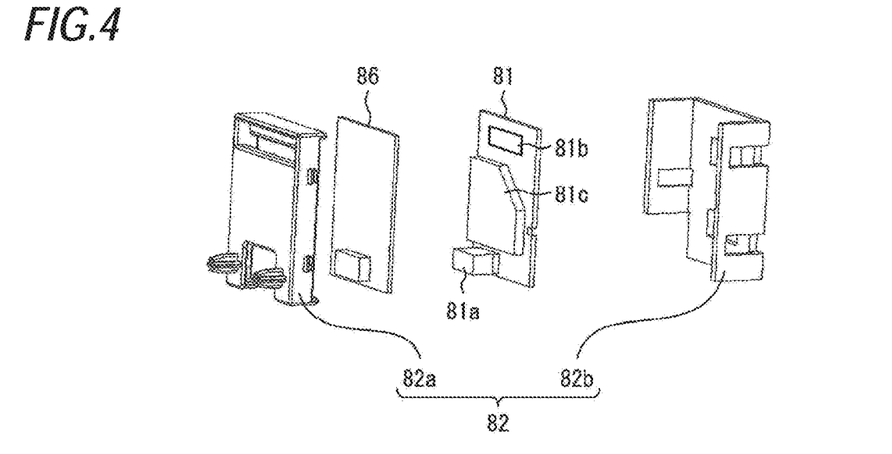
FIG. 4 is a perspective view of the attached situation of the holder, the wireless communication substrate and the sub-substrate shown in FIG. 3, as seen from the left side of the image forming apparatus.

FIG. 3 is a perspective view showing an attached situation of the holder 82, the wireless communication substrate 81 and the sub-substrate 86 to the main substrate 85. FIG. 4 is a perspective view showing a situation where the holder 82 shown in FIG. 3 holds the wireless communication substrate 81 and the sub-substrate 86.

(Wireless Communication Substrate 81)

As shown in FIG. 3, the wireless communication substrate 81 has a second connector 81a, and an antenna 81b configured to perform wireless communication. The second connector 81a is a connector for connecting to a second sub-connector 86b provided on the sub-substrate 86, and is configured to be attached and detached to and from the sub-substrate 86. The antenna 81b is an antenna element for transmitting radio waves from the wireless communication substrate 81 and receiving radio waves.

In addition, as shown in FIG. 4, the wireless communication substrate 81 further has a wireless communication module 81c. The wireless communication module 81c is responsible for transmitting a signal received by the antenna 81b to the main substrate 85 and instructing the antenna 81b to transmit radio waves based on a command from the main substrate 85.

(Main Substrate 85)

The main substrate 85 has a first connector 85a and an opening portion 85b. The first connector 85a is a connector configured to connect to a first sub-connector 86a provided on the sub-substrate 86. The first connector 85a is configured so that the sub-substrate 86 held by the holder 82 can be attached and detached. The first connector 85a has a concave connector shape. The opening portion 85b is a hole portion that is used so as to position the holder 82 with respect to the main substrate 85. A hole diameter of the opening portion 85b has such a size that is slightly larger than an outer shape of a protrusion 82f of the holder 82, and therefore, the protrusion 82f can be inserted.

(Sub-Substrate 86)

As shown in FIG. 3, the sub-substrate 86 is a substrate interposed between the main substrate 85 and the wireless communication substrate 81. The sub-substrate 86 is a substrate for converting a pin shape of a male terminal of the second connector 81a on the wireless communication substrate 81 into a convex first sub-connector 86a for fitting into the concave shape of the first connector 85a on the main substrate 85.

(Holder 82)

As shown in FIGS. 3 and 4, the holder 82 is configured to cover the sub-substrate 86 and the wireless communication substrate 81, except the first sub-connector 86a on the sub-substrate 86. In a state where the wireless communication substrate 81 and the sub-substrate 86 are held by the holder 82, the wireless communication substrate 81 and the sub-substrate 86 are attached to the main substrate 85. The first sub-connector 86a on the sub-substrate 86 and the first connector 85a on the main substrate 85 are connected.

In a case where the holder 82 is attached to the main substrate 85, the protrusion 82f of the holder 82 is inserted into the opening portion 85b and the first connector 85a on the main substrate 85 and the first sub-connector 86a on the sub-substrate 86 are connected.

The holder 82 is configured by a first unit 82a and a second unit 82b. The first unit 82a and the second unit 82b are fitted to each other and integrated.

(Attachment/Detachment Structure of Main Substrate 85, Sub-Substrate 86 and Wireless Communication Substrate 81)

Figure 5:
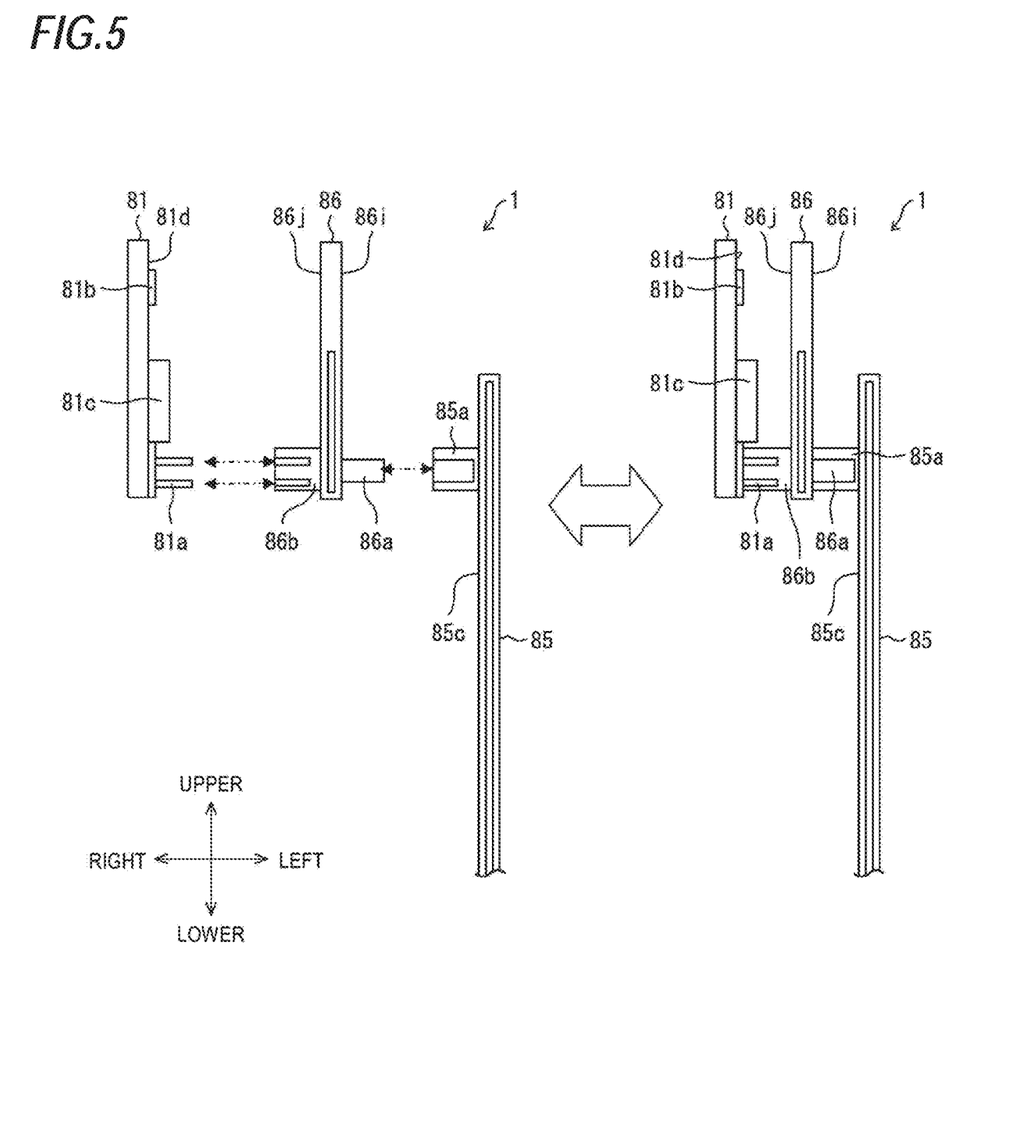
FIG. 5 is a cross-sectional view showing a connection structure of respective connectors on the main substrate, the sub-substrate and the wireless communication substrate.

FIG. 5 is a cross-sectional view showing an attachment/detachment structure of the respective connectors on the main substrate 85, the sub-substrate 86 and the wireless communication substrate 81. The left figure of FIG. 5 shows a state where the respective connectors on the respective substrates are detached each other. The right figure of FIG. 5 shows a state where the respective connectors on the respective substrates are attached each other.

As shown in FIG. 5, the first connector 85a is installed on a substrate surface 85c of the main substrate 85. The first sub-connector 86a is installed on a first substrate surface 86i of the sub-substrate 86, and the second sub-connector 86b is installed on a second substrate surface 86j that is a back surface of the first substrate surface 86i.

The first sub-connector 86a is connected to the first connector 85a on the main substrate 85 so that the first substrate surface 86i of the sub-substrate 86 and the substrate surface 85c of the main substrate 85 are parallel. The second sub-connector 86b is connected to the second connector 81a on the wireless communication substrate 81 so that the second substrate surface 86j of the sub-substrate 86 and a substrate surface 81d of the wireless communication substrate 81 are parallel.

The main substrate 85 is electrically connected to the wireless communication module 81c via the first connector 85a, the first sub-connector 86a, the second sub-connector 86b, and the second connector 81a. As described later, the main substrate 85 can supply a power supply voltage to the wireless communication substrate 81 via the first connector 85a, the first sub-connector 86a, the second sub-connector 86b and the second connector 81a, and can perform transmission and reception of signals, transfer of commands and the like with respect to the wireless communication module 81c.

As shown in FIGS. 1 and 2, the image forming apparatus 1 has an opening/closing cover 83 configured to close an opening portion 22b formed in a side surface 22a of the right side surface 22. The image forming apparatus 1 is configured so that a user can detach the holder 82 from the main substrate 85 in a state where the opening/closing cover 83 is opened. As described above, the shape of the first sub-connector 86a on the sub-substrate 86 is a convex shape, not a pin shape. In addition, the first connector 85a on the main substrate 85 has a concave shape. Therefore, the first sub-connector 86a on the sub-substrate 86 can be easily fitted into the first connector 85a on the main substrate 85, so that the user can easily attach and detach the holder 82 to and from the main substrate 85.

In a case where a power supply of the image forming apparatus 1 is on, there is a possibility that the opening/closing cover 83 will be opened and the holder 82 will be detached from the main substrate 85 by the user. If the user detaches the holder 82 from the main substrate 85 while the power supply of the imaging device 1 is on, the first sub-connector 86a on the sub-substrate 86 in the holder 82 may be pulled out tilted relative to the first connector 85a on the main substrate 85, depending on an orientation in which the holder 82 is detached from the main substrate 85.

In this case, between the first sub-connector 86a and the first connector 85a, the respective ground terminals may be uncoupled from each other earlier than the respective power supply terminals while the respective power supply terminals remain electrically connected each other. If a power supply voltage is supplied from the main substrate 85 to the wireless communication substrate 81 via the first sub-connector 86a, the first connector 85a and the like in a state where the ground is not connected to the wireless communication module 81c and the main substrate 85, a high power supply voltage is supplied to the wireless communication substrate 81, i.e., the wireless communication module 81c, which may damage the wireless communication module 81c.

Therefore, a configuration of the image forming apparatus 1 by which the voltage supply from the main substrate 85 to the wireless communication substrate 81 can be stopped when the ground is no longer connected to the ground terminal of the wireless communication substrate 81 is described in detail.

(Configuration Example of Wireless Communication Substrate 81, Sub-Substrate 86 and Main Substrate 85)

Figure 6:
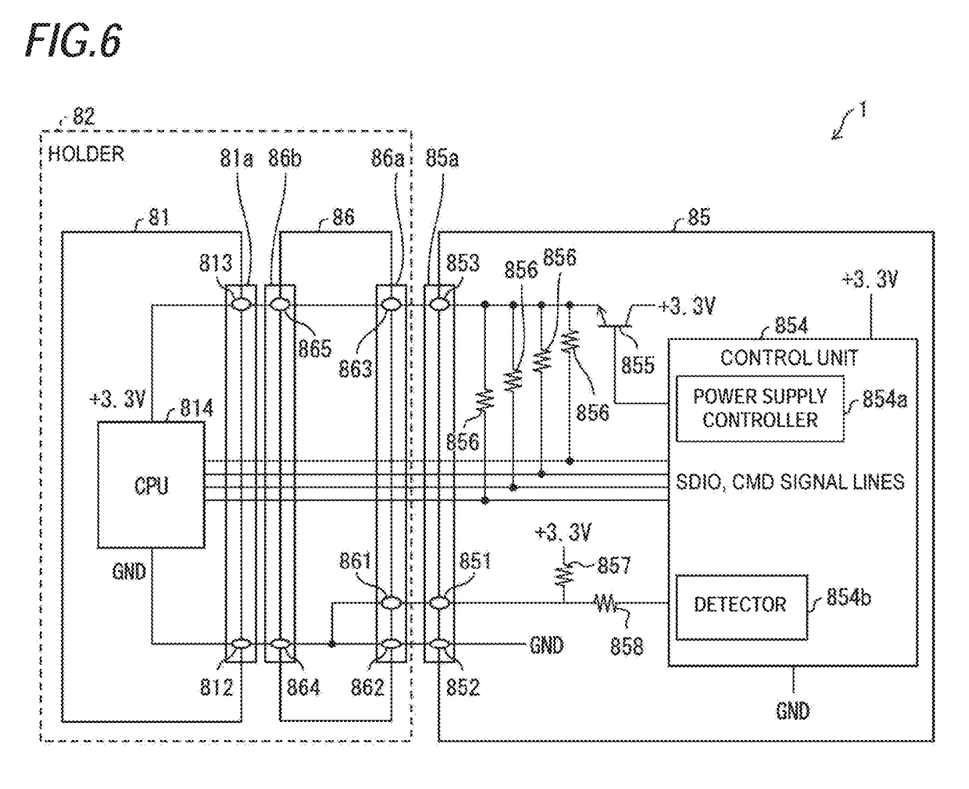
FIG. 6 shows a configuration example of the image forming apparatus according to the first illustrative embodiment of the present disclosure.

FIG. 6 shows a configuration example of the image forming apparatus 1. The first connector 85a on the main substrate 85 is provided with a detection terminal 851, an earth terminal 852, and an output terminal 853. In addition, the first sub-connector 86a on the sub-substrate 86 is provided with a first sub-terminal 861, a second sub-terminal 862, and a third sub-terminal 863. The first connector 85a and the first sub-connector 86a are respectively provided with a plurality of terminals configured to transmit/receive signals from an SDIO (Serial Data Input Output) signal line and a CMD (command) signal line.

When the holder 82 is attached to the main substrate 85 and the first connector 85a on the main substrate 85 and the first sub-connector 86a on the sub-substrate 86 are connected, the detection terminal 851 and the first sub-terminal 861 are connected, the earth terminal 852 and the second sub-terminal 862 are connected, and the output terminal 853 and the third sub-terminal 863 are connected.

In addition, the second connector 81a on the wireless communication substrate 81 is provided with a second terminal 812 and an input terminal 813. In addition, the second sub-connector 86b on the sub-substrate 86 is provided with a fourth sub-terminal 864 and a fifth sub-terminal 865.

The second connector 81a on the wireless communication substrate 81 and the second sub-connector 86b on the sub-substrate 86 are connected, the second terminal 812 and the fourth sub-terminal 864 are connected, and the input terminal 813 and the fifth sub-terminal 865 are connected. The second connector 81a and the second sub-connector 86b are respectively provided with a plurality of terminals configured to transmit/receive signals from the SDIO signal line and the CMD signal line.

The main substrate 85 has a controller 854, a transistor 855, four pull-up resistors 856, a pull-up resistor 857, and a resistor 858. In addition, the controller 854 has a power supply controller 854a and a detector 854b. The transistor 855 is an example of a switching element.

The sub-substrate 86 is a multi-layer printed substrate with an intermediate layer of a metal layer. The first sub-terminal 861 and the second sub-terminal 862 are connected toward the metal layer of the sub-substrate 86, respectively. The first sub-terminal 861 and the second sub-terminal 862 are electrically connected via the metal layer of the sub-substrate 86.

The second sub-terminal 862 and the fourth sub-terminal 864 are connected electrically via a through hole 86g, which connects the first substrate surface 86i (refer to FIG. 8) and the second substrate surface 86j (refer to FIG. 8) of the sub-substrate 86.

In a case where the first connector 85a and the first sub-connector 86a are not connected, a high level (hereinafter, referred to as 'H level') is input to the detector 854b by the pull-up resistor 857. Also, in a case where the first connector 85a and the first sub-connector 86a are connected, a low level (hereafter, referred to as 'L level') is input to the detector 854b because current flows through a ground (GND) via the detection terminal 851, the first sub-terminal 861, the second sub-terminal 862, and the earth terminal 852.

In a case where the H level is input to the detector 854b, the detector 854b is configured to instruct the power supply controller 854a to stop supply of the power supply voltage because the detection terminal 851 and the first sub-terminal 861 or the earth terminal 852 and the second sub-terminal 862 are not connected. In a case where the L level is input to the detector 854b, the detector 854b is configured to instruct the power supply controller 854a to supply the power supply voltage because the detection terminal 851 and the first sub-terminal 861 are connected and the earth terminal 852 and the second sub-terminal 862 are connected.

The controller 854 has the SDIO and CMD signal lines for controlling a CPU (Central Processing Unit) 814 provided on the wireless communication substrate 81, and the respective signal lines are pulled up by the pull-up resistors 856. Note that, the CPU 814 is included in the wireless communication module 81c.

A ground of the CPU 814 is connected to the ground (GND) of the main substrate 85 via the second terminal 812 of the wireless communication substrate 81, the fourth sub-terminal 864 of the sub-substrate 86, the through-hole 86g connecting the first substrate surface 86i and the second substrate surface 86j, the second sub-terminal 862 and the earth terminal 852 of the main substrate 85. In addition, the wireless communication module 81c including the CPU 814 is supplied with the power supply voltage from the main substrate 85 via the output terminal 853, the third sub-terminal 863, the fifth sub-terminal 865 and the input terminal 813.

In the controller 854, an output circuit (not shown) configured to output signals to the SDIO and CMD signal lines consists of an open drain circuit or an open collector circuit, and is configured either to output the L level or to be a high impedance. When the output circuit becomes a high impedance, the signals become H levels by the pull-up resistors 856.

When it is detected by the detector 854b that the detection terminal 851 and the first sub-terminal 861 or the earth terminal 852 and the second sub-terminal 862 are not connected, the power supply controller 854a turns off the transistor 855 to stop the supply of the power supply voltage (+3.3V) to the wireless communication substrate 81. At this time, the supply of the power supply voltage to the pull-up resistors 856 is also stopped. Thereby, the voltage is not supplied to the signal lines and a latch-up or the like does not occur at the time of stopping the supply of the power supply voltage to the wireless communication substrate 81. Note that, the power supply voltage is supplied from a 3.3V power supply of the main substrate 85.

In addition, when it is detected by the detector 854b that the detection terminal 851 and the first sub-terminal 861 are connected and the earth terminal 852 and the second sub-terminal 862 are connected, the power supply controller 854a turns on the transistor 855 to supply the power supply voltage to the wireless communication substrate 81. At this time, the supply of the power supply voltage to the pull-up resistors 856 is also performed.

<Specific Example of Case where Holder 82 is Detached from Main Substrate 85>

For example, in a case where the holder 82 is detached from the main substrate 85, i.e., in a case where the first sub-connector 86a is pulled out from the first connector 85a, when the detection terminal 851 and the first sub-terminal 861 or the earth terminal 852 and the second sub-terminal 862 are uncoupled before the output terminal 853 and the third sub-terminal 863 are uncoupled, the current does not flow from the pull-up resistor 857 to the ground and the detector 854b detects the H level.

When it is detected by the detector 854b that the detection terminal 851 and the first sub-terminal 861 or the earth terminal 852 and the second sub-terminal 862 are not connected, the power supply controller 854a turns off the transistor 855 to stop the supply of the power supply voltage to the wireless communication substrate 81. At this time, the supply of the power supply voltage to the pull-up resistors 856 is also stopped.

Figure 7:
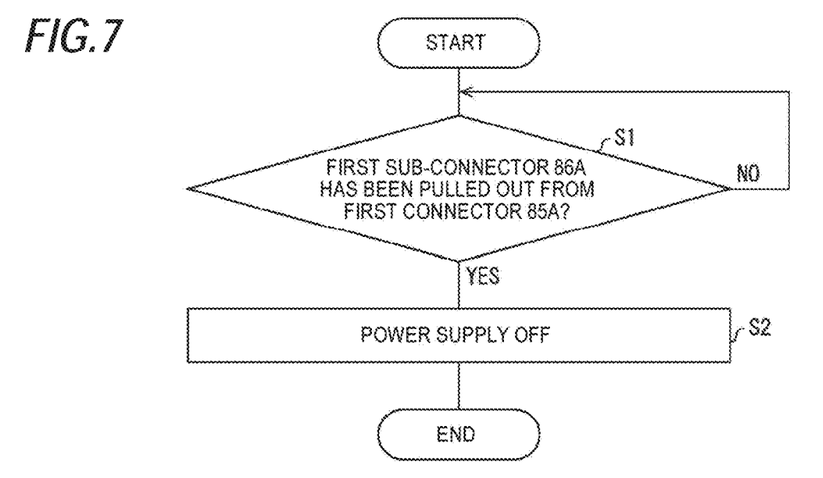
FIG. 7 is a flowchart for illustrating a processing procedure of the image forming apparatus according to the first illustrative embodiment of the present disclosure.

FIG. 7 is a flowchart for illustrating a processing procedure of the image forming apparatus 1. First, the controller 854 determines whether the first sub-connector 86a connected to the first connector 85a has been pulled out, based on whether the H level or L level has been input to the detector 854b (S1).

When the first sub-connector 86a has not been pulled out from the first connector 85a (S1, No), the controller 854 repeats the processing of step S1.

When the first sub-connector 86a has been pulled out from the first connector 85a (S1, Yes), the controller 854 turn off the transistor 855 to stop the supply of the power supply voltage to the wireless communication substrate 81 and the pull-up resistors 856 by using the power supply controller 854a, and ends the processing.

As described above, when the user pulls out the first sub-connector 86a on the sub-substrate 86 from the first connector 85a on the main substrate 85 via the holder 82, it is possible to prevent the power supply voltage from being supplied from the output terminal 853 of the main substrate 85 to the input terminal 813 of the wireless communication substrate 81 in a state where the ground is not connected to the first sub-terminal 861 or the second sub-terminal 862 of the sub-substrate 86.

(Arrangement Example of First Sub-Terminal 861 and Second Sub-Terminal 862)

Figure 8:
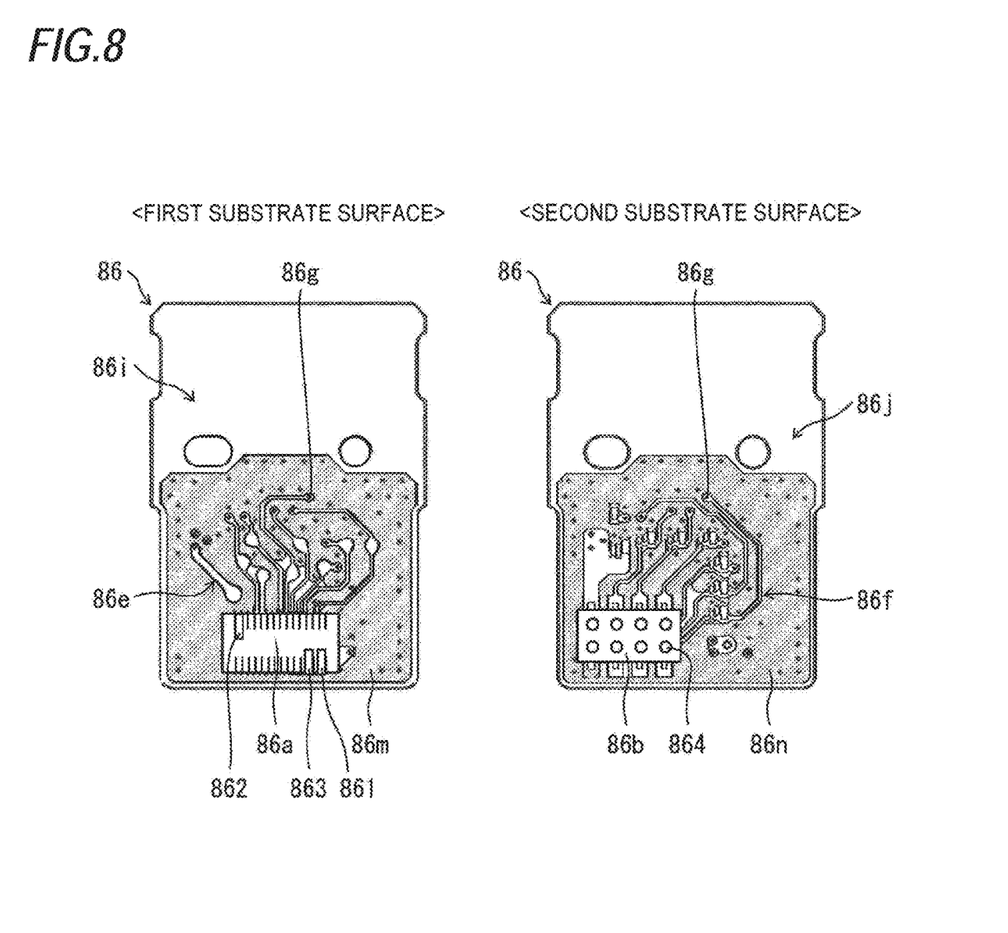
FIG. 8 is a plan view showing a first substrate surface and a second substrate surface of the sub-substrate.

FIG. 8 is a plan view showing the first substrate surface 86i and the second substrate surface 86j of the sub-substrate 86. The first substrate surface 86i is a surface facing the substrate surface 85c of the main substrate 85 shown in FIG. 5. The second substrate surface 86j is a surface facing the substrate surface 81d of the wireless communication substrate 81 shown in FIG. 5. The left figure of FIG. 8 shows the first substrate surface 86i. The right figure of FIG. 8 shows the second substrate surface 86j.

When the sub-substrate 86 is seen from the first substrate surface 86i shown in the left figure of FIG. 8, a wiring pattern 86e is arranged in a hatching part 86m hatched of the sub-substrate 86. The first sub-connector 86a is electrically connected to the wiring pattern 86e.

On the other hand, when the sub-substrate 86 is seen from the second substrate surface 86j shown in the right figure of FIG. 8, a wiring pattern 86f is arranged in a hatching part 86n hatched of the sub-substrate 86. The second sub-connector 86b is electrically connected to the wiring pattern 86f.

The sub-substrate 86 is provided with the through-hole 86g penetrating through the sub-substrate 86. The wiring pattern 86e shown in the left figure of FIG. 8 and the wiring pattern 86f shown in the right figure of FIG. 8 are electrically connected via the through-hole 86g. The wiring pattern 86e and the wiring pattern 86f are electrically connected, so that the first sub-connector 86a and the second sub-connector 86b are electrically connected.

As shown in the left figure of FIG. 8, when seen from above the first sub-connector 86a of the sub-substrate 86, the first sub-terminal 861 and the second sub-terminal 862 are arranged at two corner portions located diagonally of the rectangular shape.

In this way, since the first sub-terminal 861 and the second sub-terminal 862 are arranged at the two corner portions located diagonally of the rectangular shape of the first sub-connector 86a, when the first sub-connector 86a on the sub-substrate 86 is obliquely pulled out from the first connector 85a on the main substrate 85, either the first sub-terminal 861 or the second sub-terminal 862 is uncoupled later than the third sub-terminal 863.

Second Illustrative Embodiment

Hereinafter, a second illustrative embodiment of the present disclosure will be described in detail. As described above, in the present illustrative embodiment, a configuration of a case where the wireless communication substrate 81 held by the holder 82 can be attached and detached to and from the main substrate 85, i.e., there is no sub-substrate 86 is described.

(Attachment/Detachment Structure of Main Substrate 85 and Wireless Communication Substrate 81)

Figure 9:
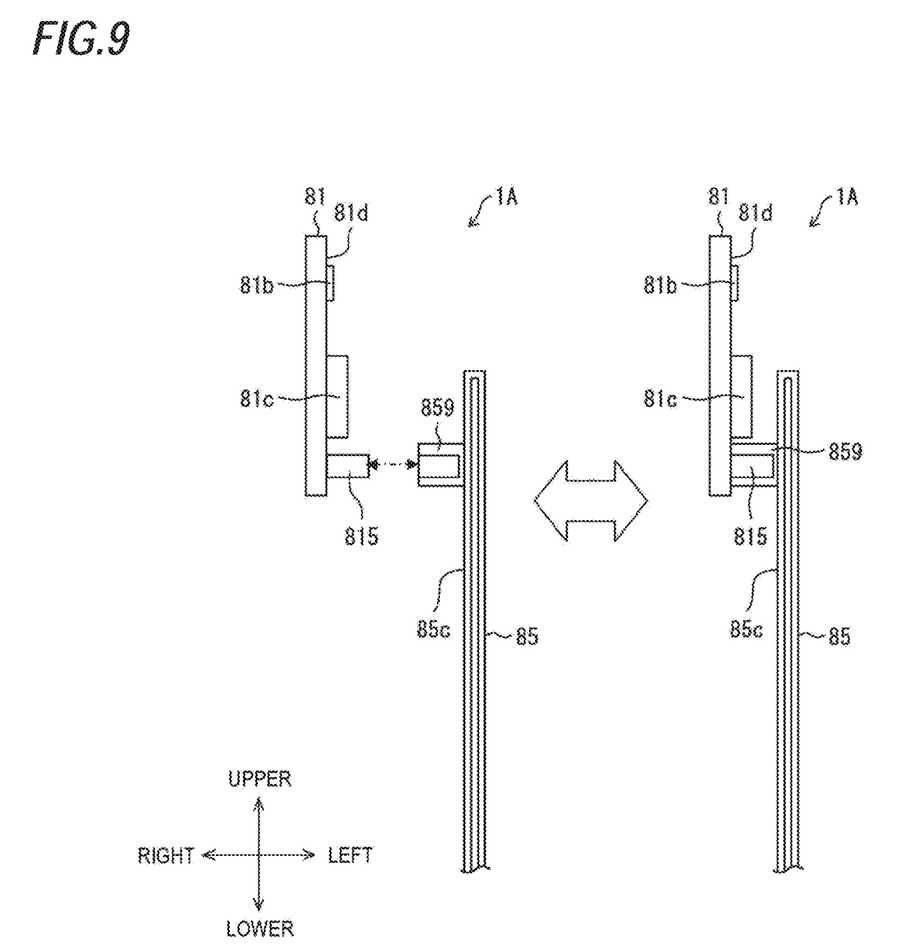
FIG. 9 is a cross-sectional view showing a connection structure of respective connectors on a main substrate and a wireless communication substrate according to a second illustrative embodiment of the present disclosure.

FIG. 9 is a cross-sectional view showing an attachment/detachment structure of the respective connectors on the main substrate 85 and the wireless communication substrate 81. The left figure of FIG. 9 shows a state where the respective connectors on the respective substrates are detached each other. The right figure of FIG. 9 shows a state where the respective connectors on the respective substrates are attached each other.

As shown in FIG. 9, a first connector 859 is installed on a substrate surface 85c of the main substrate 85. A second connector 815 is installed on the substrate surface 81d of the wireless communication substrate 81. Note that, the first connector 859 has the same configuration as the first connector 85a shown in FIG. 5. In addition, the second connector 815 has the same configuration as the first sub-connector 86a shown in FIG. 5.

The second connector 815 is connected to the first connector 859 on the main substrate 85 so that the substrate surface 81d of the wireless communication substrate 81 and the substrate surface 85c of the main substrate 85 are parallel. Note that, it is assumed that the term 'parallel' includes not only a case of being completely parallel but also a state close to parallel, for example, a state of being shifted from a parallel plane by several degrees.

Figure 10:
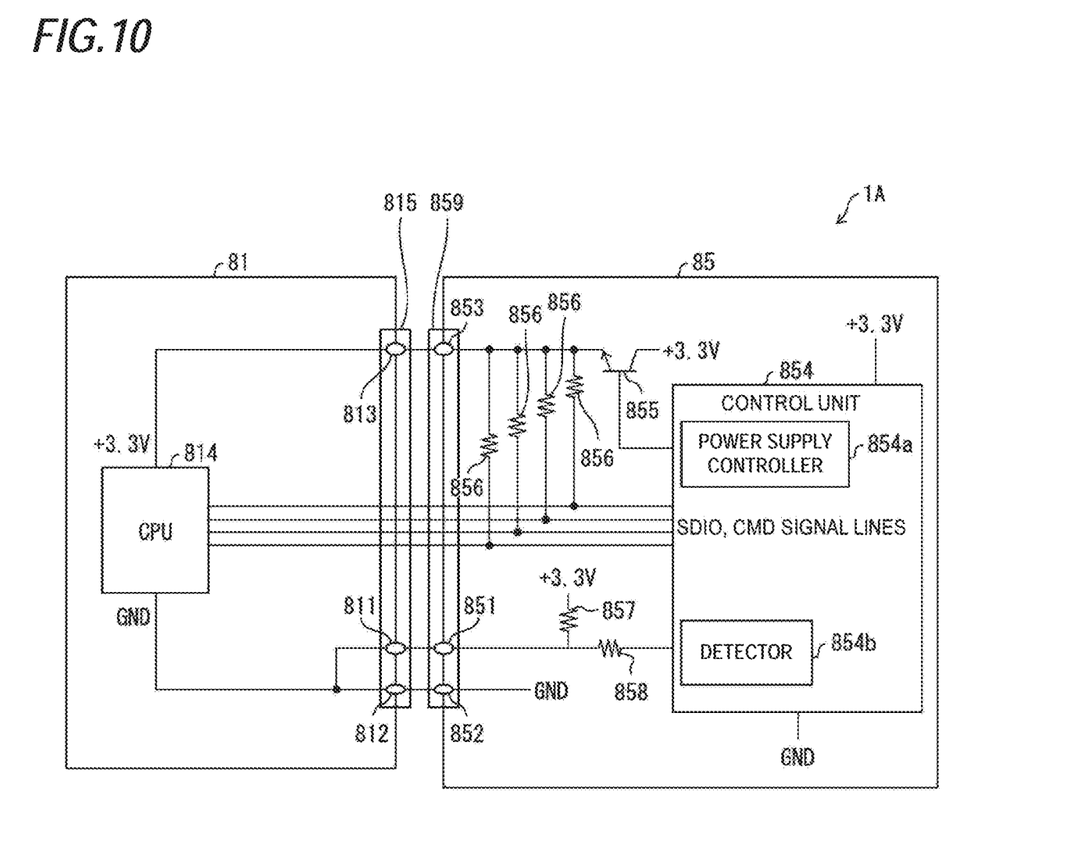
FIG. 10 shows a configuration example of an image forming apparatus according to the second illustrative embodiment of the present disclosure.

FIG. 10 shows a configuration example of an image forming apparatus 1A. Note that, the image forming apparatus 1A shown in FIG. 10 has a configuration where the wireless communication substrate 81 and the main substrate 85 are directly connected without passing through the sub-substrate 86, as shown in FIG. 9. The first connector 859 on the main substrate 85 is provided with a detection terminal 851, an earth terminal 852, and an output terminal 853. In addition, the second connector 815 on the wireless communication substrate 81 is provided with a first terminal 811, a second terminal 812 and an input terminal 813.

When the first connector 859 on the main substrate 85 and the second connector 815 on the wireless communication substrate are connected, the detection terminal 851 and the first terminal 811 are connected, the earth terminal 852 and the second terminal 812 are connected, and the output terminal 853 and the input terminal 813 are connected.

Similar to the first illustrative embodiment, the main substrate 85 has a controller 854, a transistor 855, four pull-up resistors 856, a pull-up resistor 857, and a resistor 858. In addition, the controller 854 has a power supply controller 854a and a detector 854b.

In the wireless communication substrate 81, the first terminal 811 and the second terminal 812 are electrically connected by a wiring arranged on the wireless communication substrate 81. The wireless communication substrate 81 is a multi-layer printed substrate with an intermediate layer of a metal layer. The first terminal 811 and the second terminal 812 are connected toward the metal layer of the wireless communication substrate 81, respectively. The first terminal 811 and the second terminal 812 are electrically connected via the metal layer of the wireless communication substrate 81.

A ground of the CPU 814 is connected to the ground (GND) of the main substrate 85 via the second terminal 812 of the wireless communication substrate 81 and the earth terminal 852 of the main substrate 85. In addition, the wireless communication module 81c including the CPU 814 is supplied with the power supply voltage from the main substrate 85 via the output terminal 853 and the input terminal 813.

Ina case where the first connector 859 and the second connector 815 are not connected, an H level is input to the detector 854b by the pull-up resistor 857. In addition, in a case where the first connector 859 and the second connector 815 are connected, an L level is input to the detector 854b because current flows through the ground (GND) via the detection terminal 851, the first terminal 811, the second terminal 812, and the earth terminal 852. The pull-up resistor 857 is an example of the current device. The ground (GND) is an example of the ground part.

In a case where the H level is input to the detector 854b, the detector 854b is configured to instruct the power supply controller 854a to stop supply of the power supply voltage because the detection terminal 851 and the first terminal 811 or the earth terminal 852 and the second terminal 812 are not connected. In addition, in a case where the L level is input to the detector 854b, the detector 854b is configured to instruct the power supply controller 854a to supply the power supply voltage because the detection terminal 851 and the first terminal 811 are connected and the earth terminal 852 and the second terminal 812 are connected.

The controller 854 has SDIO and CMD signal lines for controlling the CPU 814 provided on the wireless communication substrate 81, and the respective signal lines are pulled up by the pull-up resistors 856. Note that, the CPU 814 is included in the wireless communication module 81c.

In the controller 854, an output circuit (not shown) configured to output signals to the SDIO and CMD signal lines consists of an open drain circuit or an open collector circuit, and is configured either to output the L level or to be a high impedance. When the output circuit becomes a high impedance, the signals become H levels by the pull-up resistors 856.

When it is detected by the detector 854b that the detection terminal 851 and the first terminal 811 or the earth terminal 852 and the second terminal 812 are not connected, the power supply controller 854a turns off the transistor 855 to stop the supply of the power supply voltage (+3.3V) to the wireless communication substrate 81. At this time, the supply of the power supply voltage to the pull-up resistors 856 is also stopped. Thereby, since the voltage is not supplied to the signal lines at the time of stopping the supply of the power supply voltage to the wireless communication substrate 81, a latch-up or the like does not occur. Note that, the power supply voltage is supplied from a power supply device (not shown).

In addition, when it is detected by the detector 854b that the detection terminal 851 and the first terminal 811 are connected and the earth terminal 852 and the second terminal 812 are connected, the power supply controller 854a turns on the transistor 855 to supply the power supply voltage to the wireless communication substrate 81. At this time, the supply of the power supply voltage to the pull-up resistors 856 is also performed.

In a case where the first connector 859 and the second connector 815 are connected, the supply of the power supply voltage to the wireless communication substrate 81 is performed. However, for example, in a case where the second connector 815 connected to the first connector 859 is pulled out, when the detection terminal 851 and the first terminal 811 or the earth terminal 852 and the second terminal 812 are uncoupled before the output terminal 853 and the input terminal 813 are uncoupled, the current does not flow from the pull-up resistor 857 to the ground and the detector 854b detects the H level.

When it is detected by the detector 854b that the detection terminal 851 and the first terminal 811 or the earth terminal 852 and the second terminal 812 are not connected, the power supply controller 854a turns off the transistor 855 to stop the supply of the power supply voltage to the wireless communication substrate 81. At this time, the supply of the power supply voltage to the pull-up resistors 856 is also stopped.

As described above, when the user pulls out the second connector 815 on the wireless communication substrate 81 from the first connector 859 on the main substrate 85, it is possible to prevent the voltage from being supplied from the output terminal 853 of the main substrate 85 to the input terminal 813 of the wireless communication substrate 81 in a state where the ground is not connected to the first terminal 811 or the second terminal 812 of the wireless communication substrate 81.

As discussed above, the present disclosure may provide at least the following illustrative, non-limiting illustrative aspects.

The wireless communication device may further include a holder configured to cover the sub-substrate and the wireless communication substrate except the first sub-connector. The holder may be able to be attached and detached to and from the main substrate by insertion of the first sub-connector to the first connector and pullout of the first sub-connector from the first connector.

According to the above-described configuration, the holder is configured to cover the sub-substrate and the wireless communication substrate, except the first sub-connector. Therefore, according to the above-described configuration, the holder can be attached and detached to and from the main substrate by inserting the first sub-connector into the first connector or pulling out the first sub-connector from the first connector.

When the controller detects that the current no longer flows, the controller may be configured to stop an output of a signal transmitted from the main substrate to the wireless communication substrate via a signal line for transmitting and receiving a signal between the main substrate and the wireless communication substrate.

According to the above-described configuration, it is possible to prevent the signal from being transmitted from the main substrate to the wireless communication substrate while the ground part is not connected to the wireless communication substrate. That is, according to the above-described configuration, it is possible to further prevent a voltage from being supplied from the main substrate to the wireless communication substrate via the signal line.

The main substrate may further include a switching element configured to control supply of the voltage to the wireless communication substrate and supply of the voltage to a pull-up resistor for pulling up the signal line. When the controller detects that the current no longer flows, the controller may be configured to turn off the switching element to stop supply of the voltage to the wireless communication substrate and supply of the voltage to the pull-up resistor.

According to the above-described configuration, the voltage supply to the wireless communication substrate and the voltage supply to the pull-up resistor can be stopped by turning off the switching element.

Seen from above the second connector on the wireless communication substrate, a shape of the second connector may be a rectangular shape. The first terminal and the second terminal may be arranged at two corner portions located diagonally of the rectangular shape.

According to the above-described configuration, since the first terminal and the second terminal are arranged at the two corner portions located diagonally of the rectangular shape of the second connector, when the second connector on the wireless communication substrate is pulled out from the first connector on the main substrate, either the first terminal or the second terminal is uncoupled later than the input terminal.

Seen from above the first sub-connector on the sub-substrate, a shape of the first sub-connector may be a rectangular shape, and the first sub-terminal and the second sub-terminal may be arranged at two corner portions located diagonally of the rectangular shape.

According to the above-described configuration, since the first sub-terminal and the second sub-terminal are arranged at the two corner portions located diagonally of the rectangular shape of the first sub-connector, when the first sub-connector on the sub-substrate is pulled out from the first connector on the main substrate, either the first sub-terminal or the second sub-terminal is uncoupled later than the third sub-terminal.

The present disclosure is not limited to the above-described illustrative embodiments and can be diversely changed within the scope defined in the claims, and configurations implemented by appropriately combining the technical means disclosed in the illustrative embodiments are also included in the technical scope of the present disclosure.

What is claimed is:

1. An image forming apparatus comprising:
   an image forming unit;
   a wireless communication device comprising:
      a main substrate configured to control the image forming unit, the main substrate comprising:
         a first connector having a detection terminal, an earth terminal and an output terminal;
         a current circuit configured to cause current to flow toward the detection terminal;
         a ground wired to the earth terminal;
         a power supply circuit configured to supply a voltage toward the output terminal; and
         a controller configured to stop supply of the voltage to the output terminal by the power supply circuit when the controller detects that current no longer flows, from a state of detecting the current flowing from the current circuit to the ground through a first terminal and a second terminal via the detection terminal, the first terminal, the second terminal and the earth terminal; and a wireless communication substrate configured to be attached to the main substrate or detached from the main substrate, the wireless communication substrate comprising a second connector having the first terminal configured to be connected to the detection terminal, the second terminal configured to be connected to the earth terminal, and an input terminal configured to be connected to the output terminal, the first terminal and the second terminal being electrically connected, wherein when the controller detects that the current no longer flows, the controller is configured to stop an output of a signal transmitted from the main substrate to the wireless communication substrate via a signal line for transmitting and receiving a signal between the main substrate and the wireless communication substrate, wherein the main substrate further comprises a switching element configured to control supply of the voltage to the wireless communication substrate and supply of the voltage to a pull-up resistor for pulling up the signal line, and wherein when the controller detects that the current no longer flows, the controller is configured to turn off the switching element to stop supply of the voltage to the wireless communication substrate and supply of the voltage to the pull-up resistor.

2. The wireless communication device according to claim 1, wherein seen from above the second connector on the wireless communication substrate, a shape of the second connector is a rectangular shape, and wherein the first terminal and the second terminal are arranged at two corner portions located diagonally of the rectangular shape.

3. An image forming apparatus comprising:
an image forming unit; and
a wireless communication device comprising:
    a main substrate configured to control the image forming unit, the main substrate comprising:
        a first connector having a detection terminal, an earth terminal and an output terminal;
        a current circuit configured to cause current to flow toward the detection terminal, a ground part wired to the earth terminal; and
        a power supply circuit configured to supply a voltage toward the output terminal; and
    a wireless communication substrate configured to be attached to the main substrate or detached from the main substrate, the wireless communication substrate comprising a second connector having a first terminal configured to be connected to the detection terminal, a second terminal configured to be connected to the earth terminal and an input terminal configured to be connected to the output terminal, the first terminal and the second terminal being electrically connected,
        wherein when the controller detects that the current no longer flows, the controller is configured to stop an output of a signal transmitted from the main substrate to the wireless communication substrate via a signal line for transmitting and receiving a signal between the main substrate and the wireless communication substrate,
        wherein the main substrate further comprises a switching element configured to control supply of the voltage to the wireless communication substrate and supply of the voltage to a pull-up resistor for pulling up the signal line, and
        wherein when the controller detects that the current no longer flows, the controller is configured to turn off the switching element to stop supply of the voltage to the wireless communication substrate and supply of the voltage to the pull-up resistor.

* * * * *